Dec. 15, 1964     D. E. DAVIDSON     3,161,715
AUTOCOLLIMATOR AND AUTOMATIC CONTROL MEANS THEREFOR
Filed Jan. 26, 1960     3 Sheets-Sheet 3
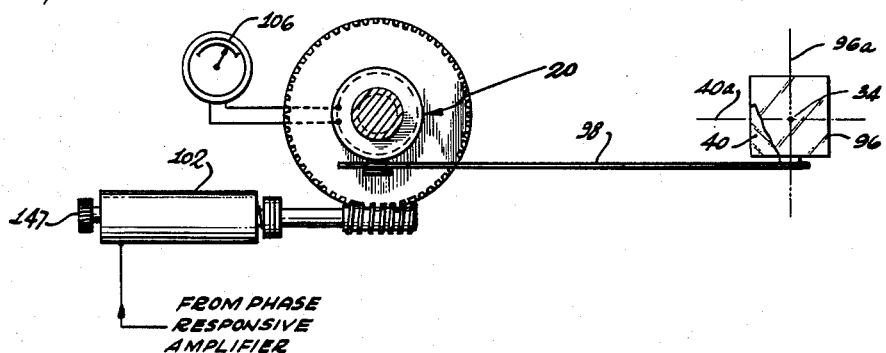
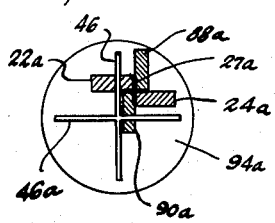 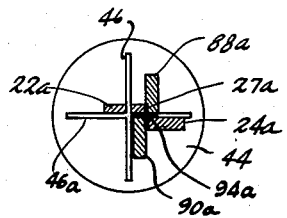 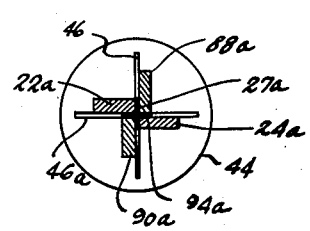
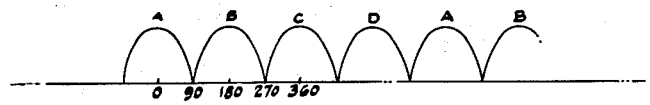
INVENTOR.
DONALD E. DAVIDSON
BY Forrest J. Lilly
Attorney United States Patent Office 3,161,715
Patented Dec. 15, 1964

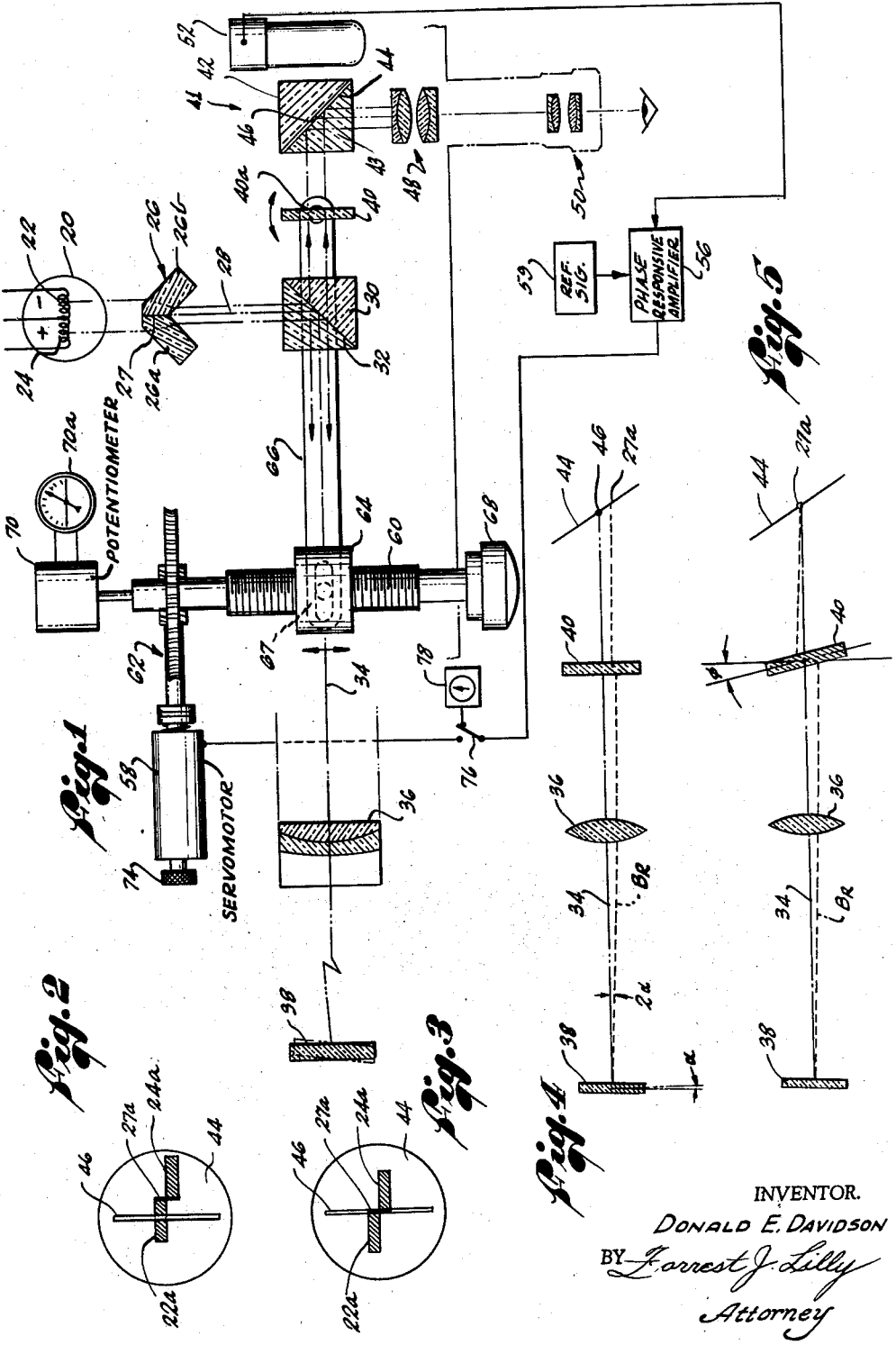

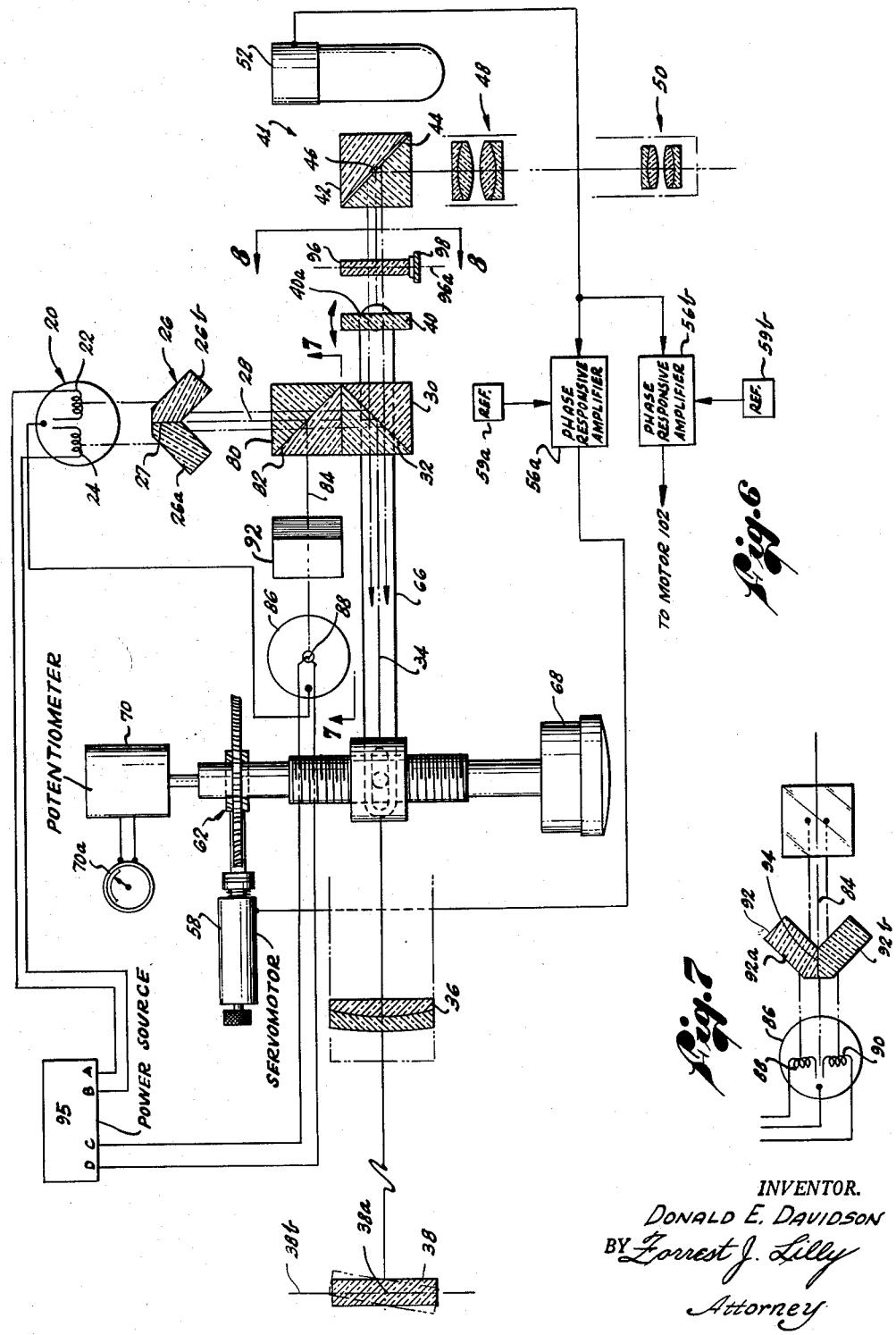

3,161,715
AUTOCOLLIMATOR AND AUTOMATIC CONTROL
MEANS THEREFOR
Donald E. Davidson, La Habra, Calif., assignor to Davidson Optronics, Inc., West Covina, Calif., a corporation of California
Filed Jan. 26, 1960, Ser. No. 4,745
10 Claims. (Cl. 88—14)

This invention deals generally with optical measuring instruments and particularly with an improved autocollimator and photoelectric control means therefor.

Briefly, the invention provides an optical instrument equipped with a light source, a lens which receives and collimates light rays from the source to produce a beam of collimated light that is directed out from the instrument along the optic axis of its lens and subsequently returned to the instrument, and a means to measure the angular deviation or departures of this returning beam from the optic axis.

A typical use of the instrument is to align a distant mirror with respect to the optic axis. In this case, the mirror is set up on the axis in such a way as to reflect the collimated beam from the instrument back to the latter. If the mirror is exactly normal to the axis, the beam is reflected back to the instrument exactly along its optic axis. If, on the other hand, the mirror is rotated slightly from its normal position, the reflected beam deviates or departs from the axis by an angle which is twice the angle of rotation of the mirror.

In the present instrument, this departure of the returning or reflected beam is measured by means of a calibrated tipping plate means located in the path of the returning beam. The departure measurement is accomplished by rotating or tipping the tipping plate means to introduce into the reflected beam a counter deivation or departure sufficient to return the beam to a position of coincidence with the axis at a predetermined point on the axis. The angle through which the plate means must be tipped to accomplish this is related to the angle of departure of the reflected beam and, therefore, to the angle of rotation of the mirror.

The present invention is primarily concerned with improving the accuracy and precision of this departure measurement and with providing a unique photoelectric control means for optical instruments of this type which greatly improves their manual operation and uniquely adapts them to automatic operation. It should be understood, of course, that the typical use mentioned above is intended to be illustrative and not limiting in nature.

A general object of this invention is, therefore, to provide a new and improved autocollimator and photoelectric control means therefor.

A more specific object of the invention is to provide an autocollimator and photoelectric control means in which deviations of a collimated beam of light from a reference optic axis are detected by sensing the phase, rather than intensity, of light incident on a photocell from the beam.

Another object of the invention is to provide an autocollimator and photoelectric control means of the character described which are insensitive to changes in the intensity of the beam of collimated light.

Yet another object of the invention is to provide a photoelectrically controlled, automatic autocollimator.

A further object of the invention is to provide an autocollimator and photoelectric control means of the character described which possess improved accuracy, sensitivity and precision.

Yet a further object of the invention is to provide an autocollimator and photoelectric control means of the character described in which angular deviations of a collimated beam from a reference optic axis can be sensed and accurately measured either in a single plane or two mutually perpendicular planes.

A still further object of the invention is to provide an autocollimator which is capable of angularly aligning an optical surface on a single axis or two mutually perpendicular axes.

Another object of the invention is to provide a unique phase responsive photoelectric control means for autocollimators and the like.

Briefly, these objects are attained by utilizing a beam of collimated light consisting, actually, of a plurality of parallel, out-of-phase light components which define therebetween an optical image of a light separator located in front of the light source of the instrument. This beam, when reflected or otherwise returned to the instrument, is directed to a photoelectric receiver having a narrow photosensitive zone located on the optic axis of the instrument and in an image plane of the collimating lens.

If the returning or reflected beam is exactly coincident with the axis, the image of the light separator is produced on the photosensitive zone of the receiver. If the returning beam deviates from the axis, on the other hand, the image is displaced from the zone and light of the beam impinges the zone. The phase of this light is dependent on the direction of the deviation and results in a phased output voltage from the receiver.

The instrument also embodies a calibrated tipping plate means in the path of the returning beam for introducing into the latter a counter deviation sufficient to return the beam to coincidence with the optic axis at the receiver. The angle through which the tipping plate means must be tipped to do this is related to the departure of the returning beam.

Manual operation of the instrument is accommodated by a meter fed from the receiver for visually indicating changes in the phase of light incident on the receiver and, thus, movements of the separator image across the sensitive zone of the receiver. Also, an eyepiece is provided through which the position of the image can be observed directly. A phase responsive servomechanism controlled by the receiver output and coupled to the tipping plate means is provided for automatic operation of the instrument.

One form of the invention determines departures or deviations of the beam in a single plane. A second, more sophisticated form of the invention permits departure determinations in two mutually perpendicular planes.

The invention will now be described in greater detail by reference to the attached drawings in which:

FIG. 1 diagrammatically illustrates the more simplified form of this invention;

FIG. 2 is a view through the eyepiece of the instrument of FIG. 1 in one condition of operation;

FIG. 3 is a view through the eyepiece in another condition of operation;

FIG. 4 diagrammatically illustrates the operating condition associated with FIG. 2;

FIG. 5 diagrammatically illustrates the operating condition associated with FIG. 3;

FIG. 6 diagrammatically illustrates the more sophisticated form of the instrument;

FIG. 7 is a section taken along line 7—7 of FIG. 6;

FIG. 8 is a section taken along line 8—8 of FIG. 6;

FIG. 9 is a view through the eyepiece of the instrument of FIG. 6 in one condition of operation;

FIG. 10 is a view through the eyepiece in another condition of operation;

FIG. 11 is also a view through the eyepiece in yet another condition of operation; and FIG. 12 illustrates the phased voltages which are used to energize the light source of the instrument of FIG. 6.

In FIGS. 1–5 of these drawings, the numeral 20 denotes the light source of the illustrated single plane autocollimator. This source actually comprises a pair of light emitters which may consist of separate lamps or, as illustrated, a pair of separate filaments 22 and 24 in a single glass envelope. These filaments are energized out of phase and are hereinafter referred to, respectively, as the minus filament and plus filament in accordance with the markings in the drawings.

Located directly in front of the light source 20 is a converger prism 26. This prism consists of a pair of optical plates 26a and 26b having abutting beveled faces which are cemented together to form an interface or light separator 27. Interface 27 is located in an optical plane passing between the filaments parallel to an optic axis 28 of the instrument. From this discussion, it is evident that light from the minus filament 22 passes through the right plate 26b of the prism while light from the plus filament 24 passes through the left plate 26a of the prism. Light rays emerge from the prism, as shown.

Located on the axis 28 in the path of these emerging light rays is a beam splitter 30. This beam splitter has a semitransmissive reflecting surface 32. The emergent light rays from the prism 26 are partially reflected by this surface along the optic axis 34 of the instrument and through a collimator lens system shown as comprising a compound collimating lens 36. Light source 20 is located just behind a focal plane of this lens. The collimated light beam emerging from the lens 36 traverses the axis 34 outwardly from the instrument. Axis 34 is, then, the primary optic axis of the instrument and axis 28 is a secondary optic axis produced by the beam splitter 30.

One illustrative use of the instrument is aligning a mirror 38 perpendicular to the optic axis 34. Assuming for the moment that the mirror 38 is exactly perpendicular to the axis, the collimated light beam incident on the mirror is reflected back along the axis, through the lens 36, to the beam splitter 30. A portion of this reflected beam is transmitted through the semitransmissive reflecting surface 32 of the beam splitter and an optical tipping plate 40, located directly behind the beam splitter, to the photoelectric receiver 41 of the instrument. This receiver comprises a pair of right angle prisms 42 and 43 having abutting, beveled faces cemented together, as shown. The beveled face of the forward prism 43 is silvered to form a reflecting or mirror surface 44. The prisms 42 and 43 are arranged so that the optic axis 34 intersects a mid point of the surface 44 and the latter is inclined to the axis, as shown. The reflecting surface 44 is provided with a narrow exit slit 46 intersecting the optic axis 34 and extending normal to the plane of the paper.

When viewed in the direction of the axis 28, the interface 27 of the converger prism 26 appears as a fine line and serves to separate the light rays from the two light emitters 22 and 24. The collimated light beam which is directed outwardly from the instrument to the mirror 38 and then reflected by the latter back to the instrument actually consists of two parallel, out-of-phase components, one from each of the filaments 22 and 24, defining therebetween an image of the interface 27. The interface or light separator 27 and reflecting surface 44 are located at focal planes of the collimating lens 36 so that a fine image of the separator, designated by the numeral 27a in FIGS. 2-5, is produced upon the reflecting surface 44. The two out-of-phase components of the beam impinge the surface 44 at opposite sides of the separator image 27a to form light spots or emitter images designated, respectively, by the numerals 22a and 24a in FIGS. 2 and 3. The separator image 27a, therefore, forms a fine line of demarcation between the light rays from one emitter and those from the other emitter. The images are reflected by the surface 44 through an erecting lens system 48 to an eyepiece 50. FIG. 3 is a view through the eyepiece under the conditions just mentioned.

Actually, the emitter images 22a and 24a are blurred images of the lamp filaments 22 and 24, respectively. Due to optical inversion, the positions of the images may be reversed from those shown in FIG. 2 when viewed through the eyepiece 50. The filament images 22a and 24a are offset along the exit slit, as shown in FIGS. 2 and 3, in order to make the demarcation between these images clearly visible through the eyepiece 50. This is accomplished by offsetting the filaments 22 and 24.

Located directly behind the exit slit 46 is a photocell 52, preferably a photomultiplier tube. This tube is located to receive light passing through the exit slit from the source 20. Coupled to the output of the photocell 52 is a conventional phase detection and servo amplifier circuit 56 for controlling a reversible servomotor 58 in response to the phase of the light incident on the photocell. Circuit 56 is supplied with a reference signal input from reference signal generator 59.

The concept of controlling a reversible servomotor in response to the phase of light incident on a photocell is well known to the art and, therefore, will not be described in detail here. Suffice it to say here that when the image 27a of the light separator 27 before the light source 20 is centered on the exit slit 46, the servomotor 58 remains stationary. When the separator image shifts from its centered position on the exit slit toward one side of the slit, the phase of light incident on the photocell changes and the circuit 56 becomes effective to operate the motor 58 in one direction. Similarly, when the separator image shifts from its centered position on the exit slit toward the opposite side of the latter, the phase of light incident on the photocell from the light source 20 again changes and the circuit 56 becomes effective to operate the servomotor 58 in the opposite direction.

The servomotor drives a lead screw 60 through reduction gearing 62. Threaded on the lead screw is a traverse nut 64. Tipping plate 40 is rigidly attached to one end of an arm 66, the other end of which is connected by a pin and slot means 67 to the traverse nut 64. The arrangement is such that movement of the nut along the lead screw, in response to rotation of the latter by the servomotor 58, causes swinging of the tipping plate 40 on its pivotal axis 40a.

The pivotal axis of the tipping plate intersects the optic axis 34 of the instrument and parallels the slit 46 in the reflecting surface 44. When the tipping plate 40 is pivoted on its axis 40a, the emergent portion of the light beam transmitted through the plate is laterally displaced with respect to the portion of the beam incident on the plate, in a plane perpendicular to the pivotal axis 40a of the tipping plate and the slit 46, in the manner illustrated in FIGS. 4 and 5. The direction in which the beam is displaced, that is, whether it is displaced upwardly or downwardly in FIGS. 4 and 5, and the amount of this displacement is related in the well-known way to the angle through which the tipping plate 40 is pivoted from its neutral position of FIG. 4 perpendicular to the optic axis 34. This property of a tipping plate to deviate or displace a beam transmitted through it is well understood in the art and, therefore, will not be explained in any greater detail here.

During this lateral displacement of the light beam transmitted through the tipping plate, the images 22a and 24a and the image 27a sweep back and forth across the slit 46. It is obvious that if the separator 27 were a fine strand, its image would become out of focus and blurred as it moved across the reflecting surface 44 owing to the inclination of the latter with respect to the optic axis 34. In the present instrument, this problem is avoided by the use of a light separator which is formed by an edge of a surface or interface having an appreciable dimension in the direction of the axis 28. This results in some part of the separator being in focus at every point on the reflecting surface 44 so that as the light beam sweeps back and forth across the surface, the image 27a remains sharp.

Assume now that the mirror 38 is rotated slightly from its aligned position perpendicular to the axis 34, on a turning axis perpendicular to the paper in FIGS. 1, 4 and 5. In this case, the collimated beam Br reflected from the mirror back to the instrument may deviate from the optic axis 34 so that the images 22a and 24a and image 27a are offset to one side or the other of the center of the exit slit 46, as in FIGS. 2 and 4. If the mirror 38 is rotated to the position shown in phantom lines in FIG. 1 and in solid lines in FIGS. 4 and 5, for example, the filament and separator images are displaced to the right of the slit 46, as illustrated in FIGS. 2 and 4. It is assumed here, of course, that the tipping plate 40 occupies its neutral position perpendicular to the optic axis 34. The filament and separator images may be returned to their aligned positions of FIG. 3, wherein the image 27a is centered with respect to the slit 46, by appropriate tipping of the plate. In the case of the clockwise misalignment illustrated in FIGS. 1 and 4, for example, the plate 40 is tipped in the counterclockwise direction as in FIG. 5. The angle φ through which the plate 40 must be tipped to return the image 27a to its centered position with respect to the slit 46 is related in a well-understood way to the deviation or departure of the reflected beam incident on the plate from the optic axis 34 of the instrument. The angle of departure of the returning beam from the optic axis 34 is, of course, twice the angle of misalignment of the mirror 38; that is to say, twice the angle between the optic axis 34 and a perpendicular to the reflecting surface of the mirror. It is clear, therefore, that the angle through which the plate 40 must be tipped to return the image 27a to its centered position on the slit 46 bears a known relationship to the departure of the returning beam and the angular misalignment of the mirror 38.

Coupled to the lead screw shaft 60 are a read out dial 68 and a potentiometer 70, connected to a meter 70a, for indicating the angular position of the tipping plate 40 both mechanically and electrically. These mechanical and electrical read-out devices may be calibrated in terms of the angle of the tipping plate 40, the angle of departure of the returning beam incident on the tipping plate, and/or the angle of the mirror or other optical element which receives the collimated beam from and subsequently returns it to the instrument.

The use of an optical tipping plate in the present instrument is highly advantageous since such a plate must be tipped through an angle of about five degrees to compensate for each one second of angular misalignment of the mirror 38. This great optical magnification coupled with the ratio of the gearing 62 and the lead screw and traverse nut 60, 64, enables each one second of angular misalignment of the mirror 38 to be represented by approximately 36 degrees angular change on the read-out dial 68, for example.

The operation of the instrument will now be described in connection with the alignment of mirror 38. If the mirror 38 is improperly aligned with respect to the axis 34, that is to say, if the mirror 38 is not exactly perpendicular to the axis but is rotated to its phantom line position, for example, the collimated beam reflected back to the mirror deviates from the optic axis 34 by an angle which is twice the angle of misalignment of the mirror. Assuming that the reflected beam is within the field of view of the instrument, the image 27a is off center in one direction with respect to the center line of the slit 46 so that the circuit 56 initiates operation of motor 58 to turn the tipping plate 40 in one direction.

Circuit 56 is so polarized that when the separator image 27a is off center in either direction from the center line of the exit slit 46, due to deviation of the reflected beam from the optic axis, the servomotor 58 tips the plate 40 to introduce into the reflected beam an opposite or counter deviation which returns the separator image toward its centered position of FIGS. 3 and 5. If the returning or reflected beam deviates from the optic axis in such a way as to produce the image condition of FIG. 2, for example, the servomotor 58 is energized by the circuit 56 in a direction to tip the plate 40 in the counterclockwise direction in FIGS. 1, 4 and 5.

In actual automatic operation of the instrument, of course, the servomotor 58 will not stop when the plate 40 has been tipped sufficiently to return the separator image to its centered position of FIGS. 3 and 5, but rather the servomotor will continue to drive in its initial direction until the separator image 27a moves slightly past its centered position and will then reverse.

From this description, it is clear that the present autocollimator, in automatic operation, constantly hunts slightly about a null position wherein the image 27a is centered on the slit 46. An already indicated, the angle of the tipping plate in this null position is related to the angle of deviation of the reflected beam from the optic axis 34 and, therefore, to the angle of misalignment of the mirror 38. The angle of the tipping plate at the null condition may, of course, be read from the dial 68 or from the electrical indicating instrument 70a in circuit with the potentiometer 70. This reading may provide a quantitative measurement of the angle of the reflecting surface with respect to the optic axis 34 or a corrective factor for use in accurately orienting the mirror perpendicular to the optic axis.

The shaft of the servomotor 58 mounts a handle 74 to permit manual operation of the instrument. For this reason also, a switch 76 is provided for switching the output of the phase detector and amplifier circuit 56 from the servomotor 58 to an indicating device or meter 78 for indicating a change in the phase of the incident light on the photocell 52. During manual operation of the instrument, then, the switch 76 is placed to connect the meter 78 to the output of the circuit 56 and the tipping plate 40 is pivoted manually by turning the handle 74. The separator image 27a is aligned with the slit 46 either by viewing the filament images through the eyepiece 50 or by watching the meter 78 for indications of movement of the separator image from one side of its centered position to the other or by a combination of these observations.

As preliminarily mentioned, and as will be evident from the preceding description, the instrument of FIGS. 1–5 is capable of determining or measuring departures of the returning beam in a single plane and the angular position of the mirror 38 on a single axis. The modified instrument of FIGS. 6–12, now to be described, enables beam departure measurements in two mutually perpendicular planes and mirror position measurements on two mutually perpendicular axes.

In these latter figures, it will be observed that the modified instrument embodies all of the elements of the instrument just described and differs from the latter instrument only in the provision of the few additional elements necessary to accomplish the above-mentioned additional functions of the instrument. Because of this basic similarity of the instruments, the parts of the instruments which are the same have, in FIGS. 6–12, been denoted by the same numerals as in FIGS. 1–5. Also, only the additional elements of the modified instrument will be discussed in any great detail in the ensuing description.

The numeral 80 in FIGS. 6–12 designates a second beam splitter which is placed between the first beam splitter 30 and the converger prism 26 along the secondary optic axis 28. This second beam splitter has a semi-transmissive reflecting surface 82 which transmits most of the light rays from the lamp 20 to the first beam splitter 30. Beam splitter 80 produces another secondary optic axis 84. Located opposite the reflecting surface 82 of the second beam splitter, on axis 84 is a second lamp 86 identical to lamp 20. This second lamp is located just behind a focal plane of the collimator lens 36 and includes a pair of filaments 88 and 90 located at opposite sides of a plane passing through the axes 28 and 84. These filaments are, therefore, spaced in a direction perpendicular to the paper in FIG. 6 and also extend in this direction.

Positioned between the second beam splitter 80 and the second lamp 86 is a second converger prism 92 identical to prism 26 and made up of a pair of optical plates 92a and 92b having abutting, beveled faces which are cemented together to form an interface 94 which forms a second light separator optically perpendicular to the first separator 27. This interface is located in the aforesaid plane passing through the axes 28 and 84. The reflecting surface 82 of the second beam splitter 80 is inclined to the axis 28 so as to reflect light rays from the lamp 86 along the axis 28 to the reflecting surface 32 of the first beam splitter 30 from whence they are reflected, with the light rays from lamp 20, along the optic axis 34 of the instrument and through the collimating lens 36.

The lamps are energized from a power source 95 which generates four output voltages A, B, C and D which are impressed on filaments 22, 24, 88 and 90, respectively. As shown in FIG. 12, these voltages comprise successive pulses so that the light from each filament is, in effect, out of phase with the light from each of the other filaments. In the following description, the light from each filament will be referred to as being of phase A, B, C or D, as the case may be.

From the description, thus far, of the instrument in FIGS. 6–12, it is evident that the collimated light beam emerging from the collimating lens 36 actually consists of four parallel out-of-phase components arranged in quadrature and defining therebetween images of the light separators 27 and 94. Separator 94, like separator 27, is located at a focal plane of the lens 36 so as to be imaged on the reflecting surface 44 of prism 42. In FIGS. 9–11, which are views through the eyepiece 50 of the modified instrument, the separator image 94 is designated by the numeral 94a while the image separator 27 is designated by the numeral 27a, as before. Also the images of filaments 88 and 90 are designated as 88a and 90a while those of filaments 22 and 24 are designated as 22a and 24a, as before. In this modified instrument, the reflecting surface 44 has two perpendicular exit slits 46 and 46a. Slit 46 optically parallels the light separator 27 and the pivotal axis 40a of the tipping plate 40, as before, while slit 46a parallels the light separator 94. These slits intersect on the optic axis 34.

Located between the tipping plate 40 and the prism 42 is a second optical tipping plate 96 which pivots on an axis 96a, perpendicular to the pivotal axis 40a of plate 40, and optically parallel to the light separator 94. The pivotal axis 96a of plate 96 therefore parallels the paper in FIG. 6.

Tipping plate 96 is rigid on an arm 98 which is arranged to be pivoted back and forth by a lead screw and traverse nut arrangement 100 identical to that described in connection with FIGS. 1–5. The lead screw of this assembly is driven by a second servomotor 102. As before, the position of the tipping plate is read either from a read-out dial (not shown) or an electrical read-out means 106, like those designated at 68 and 70a in FIGS. 1 and 6.

During operation of the instrument, light of the returning beam passes through the slits 46 and 46a to the photocell 52, as before, and as will presently be more fully discussed. The photocell, of course, generates an output voltage having the same phase components as the light incident on the photocell; that is to say, the photocell generates an output voltage containing only a phase A component in response to incident light from filament 22 only. Similarly, incident light from filaments 24 and 90 will result in an output voltage from the photocell containing phase B and D components, and so forth.

The output of photocell 52 is applied to the input of two phase detection and amplifier circuits 56a and 56b which are fed with reference inputs from generators 59a and 59b. The output of circuit 56a is applied to the servomotor 58 while the output of circuit 56b is applied to the servomotor 102. Circuit 56a is arranged to respond only to phase A and B components in the photocell output and to operate the servomotor 58 in response to these components in such a way as to pivot the tipping plate 40 about a null position wherein the image 27a is centered on the slit 46, as before. Similarly, circuit 56b is arranged to respond only to phase C and D components in the photocell output and to operate the servomotor 102 in a way to cause pivoting of the second tipping plate 96 about a null position wherein the second image 94a is centered on the slit 46a.

It is evident that the null angle of the tipping plate 40 is related to the departure of the returning collimated beam from the optic axis 34 in the plane of slit 46 while the null angle of the tipping plate 96 is obviously related to the departure of the returning beam from the optic axis in the plane of slit 46a. Similarly, the null angle of the tipping plate 40 is related to the angular alignment of the mirror 38 on an axis 38a perpendicular to the paper in FIG. 6 while the null angle of the tipping plate 96 is related to the angular alignment of the mirror 38 on a second axis 38b perpendicular to the first axis and to the optic axis 34.

As mentioned, FIGS. 9–11 are views through the eyepiece 50 of the instrument under different conditions of operation. For example, in FIG. 9, the images 22a and 24a and image 27a are offset to the right of the slit 46. Under this condition, of course, image 22a falls on slit 46 so that light of phase A is incident on the photocell 52 and the servomotor 58 is energized to tip the tipping plate 40 in the counterclockwise direction in FIGS. 1, 4 and 5 to return the image 27a toward the slit 46. In FIG. 9, it will also be observed that the images 88a and 90a and the image 94a are displaced above the horizontal slit 46a. The image 90a thus falls on the slit 46a and light of phase D is also incident on the photocell so that the second servomotor 102 is simultaneously energized to tip the second tipping plate 96 in a direction to return the image 94a toward the horizontal slit 46a. FIG. 9, of course, represents a situation in which the mirror 38 is misaligned on both axes 38a and 39b. The angles through which the plates must be tipped to center their respective separator images on the respective slits are, of course, related to the angular misalignment of the mirror on its two axes.

FIG. 10 represents a situation in which the mirror is aligned perpendicular to the optic axis 34 on its axis 38b but is misaligned with respect to the optic axis on its axis 38a. In this case, obviously, the image 94a falls exactly upon the slit 46a when the tipping plate 96 occupies its neutral position perpendicular to the optic axis 34 so that the servomotor 102 remains inactive. Motor 58, on the other hand, is energized by circuit 56a to tip plate 40 in a direction to return the image 27a toward the vertical slit 46. If the mirror were misaligned only on its axis 38b, obviously, only tipping plate 96 would be operated. FIG. 11 illustrates a condition in which the mirror is aligned perpendicular to the optic axis 34 on both of its axes 38a and 38b.

It is evident from FIGS. 9–11 that a situation may arise where image 22a (or 88a) falls on one of the slits 46 or 46a and its associated image 24a (or 90a) falls on the other slit. In this case, the photocell output would obviously contain both phase components A and B (or C and D) and the associated photocell would remain inactive. A study of the figures will further show, however, that whenever the above condition exists, one of the remaining filament images also falls on one of the exit slits.

For example, if the images were shifted downwardly in FIG. 9 until image 24a falls on the horizontal slit 46a while image 22a falls on the vertical slit 46 so that servomotor 58 remains inactive although the image 94a is not aligned with the horizontal slit 46a, image 90a also falls on the horizontal slit so that servomotor 102 operates to shift the images downwardly in FIG. 9 until the image 94a is aligned with the horizontal slit. Then, only image 22a falls on a slit and servomotor 58 is operated to shift the image 27a toward the vertical slit 46.

Clearly, then, in any condition of departure of the returning or reflected beam from the optic axis 34, one or both servomechanisms are energized to operate their respective tipping plates about null positions related to the angular misalignment of the mirror 38 on the axes 38a and 38b, respectively.

This application is a continuation-in-part of application Serial No. 701,418 filed December 9, 1957, now abandoned, for Autocollimator and Automatic Control Means Therefor.

What is claimed is:

1. In an autocollimator for aligning a distant optical reflector, the combination of:
   a collimator lens system having an optic axis along which said reflector is adapted to be located,
   a light source along said axis including two light emitters which are energized out of phase and located at opposite sides of an optic plane parallel to said axis,
   means along said axis between said lens system and light emitters defining a narrow light separator in said optic plane,
   said lens system receiving and collimating light rays from said emitters to produce a collimated light beam which is transmitted to and reflected back by said reflector and said lens system being focused to procedure an optical image of said separator in an image plane transverse to said axis,
   a photoelectric receiver along said axis for receiving the reflected light beam including a narrow zone of photosensitive detection parallel to said optic plane and located in said image plane,
   an optical tipping plate along said axis directly before said zone arranged with its tipping axis parallel to said planes,
   means for indicating the angle of said plate on its tipping axis,
   means for tipping said plate, and
   phase-sensing means coupled to the output of said receiver for sensing and indicating changes in the phase of the light incident on said zone from said emitters.

2. In an autocollimator for aligning a distant optical reflector, the combination of:
   a collimator lens system having an optic axis along which said reflector is adapted to be located,
   a light source along said axis including two light emitters which are energized out of phase and located at opposite sides of an optic plane parallel to said axis,
   means along said axis between said lens system and light emitters defining a narrow light separator in said optic plane and extending for a distance in the direction of said axis,
   said lens system receiving and collimating light rays from said emitters to produce a collimated light beam which is transmitted to and reflected back by said reflector,
   a photoelectric receiver along said axis for receiving the reflected light beam including a surface along and inclined with respect to said axis and a narrow zone of photosensitive detection parallel to said optic plane and located in the plane of said surface,
   said lens system being focused to produce an optical image of said light separator on said surface,
   an eyepiece for viewing said image,
   an optical tipping plate along said axis directly before said zone arranged with its tipping axis parallel to said planes,
   means for indicating the angle of said plate on its tipping axis,
   means for tipping said plate, and
   phase-sensing means coupled to the output of said receiver for sensing and indicating changes in the phase of the light incident on said zone from said emitters.

3. In an autocollimator for aligning a distant optical reflector, the combination of:
   a collimator lens system having an optic axis along which said reflector is adapted to be located,
   a light source along said axis including two light emitters which are energized out of phase and located at opposite sides of an optic plane parallel to said axis,
   means along said axis between said lens system and light emitters defining a narrow light separator in said optic plane,
   said lens system receiving and collimating light rays from said emitters to produce a collimated light beam which is transmitted to and reflected back by said reflector,
   a photoelectric receiver along said axis for receiving the reflected light beam including an opaque surface along said axis having a narrow light permeable slit parallel to said optic plane and photosensitive means behind said slit to receive light passing therethrough from said emitters,
   said lens system being focused to produce an optical image of said light separator on said surface,
   an optical tipping plate along said axis directly before said slit arranged with its tipping axis parallel to said plane and surface,
   means for indicating the angle of said plate on its tipping axis,
   means for tipping said plate, and
   phase-sensing means coupled to the output of said receiver for sensing and indicating changes in the phase of the light incident on said photosensitive means from said emitters.

4. In an autocollimator for aligning a distant optical reflector, the combination of:
   a collimator lens system having an optic axis along which said reflector is adapted to be located,
   a light source along said axis including two light emitters which are energized out of phase and located at opposite sides of an optic plane parallel to said axis,
   a pair of optical plates along said axis between said light source and lens system having cemented abutting faces forming a light separator therebetween in an optic plane parallel to said axis,
   said lens system receiving and collimating light rays from said emitters to produce a collimated light beam which is transmitted to and reflected back by said reflector and said lens system being focused to produce an optical image of said separator in an image plane transverse to said axis,
   a photoelectric receiver along said axis for receiving the reflected light beam including a narrow zone of photosensitive detection parallel to said optic plane and located in said image plane,
   an optical tipping plate along said axis directly before said zone arranged with its tipping axis parallel to said planes,
   means for indicating the angle of said plate on its tipping axis,
   means for tipping said plates, and
   phase-sensing means coupled to the output of said receiver for sensing and indicating changes in the phase of the light incident on said zone from said emitters.

5. In an autocollimator for aligning a distant optical reflector, the combination of:
   a collimator lens system having an optic axis along which said reflector is adapted to be located,
   a light source along said axis including two light emitters which are energized out of phase and located at opposite sides of an optic plane parallel to said axis,
   means along said axis between said lens system and light emitters defining a narrow light separator in said optic plane, said lens system receiving and collimating light rays from said emitters to produce a collimated light beam which is transmitted to and reflected back by said reflector and said lens system being focused to produce an optical image of said separator in an image plane transverse to said axis, a photoelectric receiver along said axis for receiving the reflected light beam including a narrow zone of photosensitive detection parallel to said optic plane and located in said image plane, an optical tipping plate along said axis directly before said zone arranged with its tipping axis approximately parallel to said planes, means for indicating the angle of said plate on its tipping axis, phase-sensing means coupled to the output of said receiver for sensing the phase of light incident on said zone from said emitters, and a reversible motor controlled by said phase-sensing means and operatively coupled to said tipping plate to turn the latter in one direction on its tipping axis in response to said zone receiving a preponderance of light of one phase from one emitter and in the opposite direction on its tipping axis in response to said zone receiving a preponderance of light of another phase from the other emitter.

6. In an autocollimator for aligning a distant optical reflector, the combination of:

a collimator lens system having an optic axis on which said reflector is adapted to be located, light source means along said axis including a first pair of light emitters located at opposite sides of a first optic plane approximately parallel to said axis and a second pair of light emitters located at opposite sides of a second optic plane approximately parallel to said axis and normal to said first plane, means for intermittently and successively energizing said emitters, means along said axis between said lens system and first emitter pair defining a narrow light separator in said first plane, means along said axis between said lens system and second emitter pair defining a narrow light separator in said second plane, said lens system receiving and collimating light rays from said emitters to produce a collimated light beam which is transmitted to and reflected back by said reflector and said lens system being focused to produce an optical image of said separators in an image plane transverse to said axis, a photoelectric receiver along said axis for receiving the reflected light beam including a first narrow zone of photosensitive detection parallel to said first plane and located in said image plane and a second narrow zone of photosensitive detection parallel to said second plane and located in said image plane in intersecting relation to said first zone, a first optical tipping plate along said axis directly before said zones having its tipping axis approximately parallel to said first plane and said image plane, a second optical tipping plate along said optic axis directly before said zones having its tipping axis approximately parallel to said second plane and said image plane, means for indicating the angle of said first plate on its tipping axis, means for indicating the angle of said second plate on its tipping axis, first phase-sensing means coupled to the output of said receiver for sensing the phase of light incident on said zones from said first emitter pair, and second phase-sensing means coupled to the output of said receiver for sensing the phase of light incident on said zones from said second emitter pair.

7. In an autocollimator for aligning a distant optical reflector, the combination of:

a collimator lens system having an optic axis on which said reflector is adapted to be located, light source means along said axis including a first pair of light emitters located at opposite sides of a first optic plane approximately parallel to said axis and a second pair of light emitters located at opposite sides of a second optic plane approximately parallel to said axis and normal to said first plane, means for intermittently and successively energizing said emitters, means along said axis between said lens system and first emitter pair defining a narrow light separator in said first plane, means along said axis between said lens system and second emitter pair defining a narrow light separator in said second plane, said lens system receiving and collimating light rays from said emitters to produce a collimated light beam which is transmitted to and reflected back by said reflector, a photoelectric receiver along said axis for receiving the reflected light beam including an opaque surface having a first narrow light permeable slit parallel to said first plane and a second narrow light permeable slit parallel to said second plane and intersecting said first slit, and a photosensitive means behind said slits for receiving light passing through said slits from said emitters, said lens system being focused to produce an optical image of said separators on said surface, a first optical tipping plate along said axis directly before said slits having its tipping axis approximately parallel to said first plane and said image plane, a second optical tipping plate along said optic axis directly before said slits having its tipping axis approximately parallel to said second plane and said image plane, means for indicating the angle of said first plate on its tipping axis, means for indicating the angle of said second plate on its tipping axis, first phase-sensing means coupled to said photosensitive means for sensing the phase of light incident on said latter means from said first emitter pair, and second phase-sensing means coupled to said photosensitive means for sensing the phase of light incident on the latter means from said second emitter pair.

8. In an autocollimator for aligning a distant optical reflector, the combination of:

a collimator lens system having an optic axis on which said reflector is adapted to be located, light source means along said axis including a first pair of light emitters located at opposite sides of a first optic plane approximately parallel to said axis and a second pair of light emitters located at opposite sides of a second optic plane approximately parallel to said axis and normal to said first plane, means for intermittently and successively energizing said emitters, means along said axis between said lens system and first emitter pair defining a narrow light separator in said first plane and extending a distance in the direction of said axis, means along said axis between said lens system and second emitter pair defining a narrow light separator in said second plane and extending a distance in the direction of said axis, said lens system receiving and collimating light rays from said emitters to produce a collimated light beam which is transmitted to and reflected back by said reflector, a photoelectric receiver along said axis for receiving the reflected light beam including a surface along and inclined to said axis, a first narrow zone of photosensitive detection parallel to said first plane and located in the plane of said surface, and a second narrow zone of photosensitive detection parallel to said second plane and located in the plane of said surface in intersecting relation to said first zone, said lens system being focused to produce optical images of said separators on said surface, an eyepiece for viewing said images, a first optical tipping plate along said axis directly before said zones having its tipping axis approximately parallel to said first plane and said surface, a second optical tipping plate along said optic axis directly before said zones having its tipping axis approximately parallel to said second plane and said surface, means for indicating the angle of said first plate on its tipping axis, means for indicating the angle of said second plate on its tipping axis, first phase-sensing means coupled to the output of said receiver for sensing the phase of light incident on said zones from said first emitter pair, and second phase-sensing means coupled to the output of said receiver for sensing the phase of light incident on said zones from said second emitter pair.

9. In an autocollimator for aligning a distant optical reflector, the combination of:

a collimator lens system having an optic axis on which said reflector is adapted to be located, light source means along said axis including a first pair of light emitters located at opposite sides of a first optic plane approximately parallel to said axis and a second pair of light emitters located at opposite sides of a second optic plane approximately parallel to said axis and normal to said first plane, means for intermittently and successively energizing said emitters, means along said axis between said lens system and first emitter pair defining a narrow light separator in said first plane, means along said axis between said lens system and second emitter pair defining a narrow light separator in said second plane, said lens system receiving and collimating light rays from said emitters to produce a collimated light beam which is transmitted to and reflected back by said reflector and said lens system being focused to produce an optical image of said separators in an image plane transverse to said axis, a photoelectric receiver along said axis for receiving the reflected light beam including a first narrow zone of photosensitive detection parallel to said first plane and located in said image plane and a second narrow zone of photosensitive detection parallel to said second plane and located in said image plane in intersecting relation to said first zone, a first optical tipping plate along said axis directly before said zones having its tipping axis approximately parallel to said first plane and said image plane, a second optical tipping plate along said optic axis directly before said zones having its tipping axis approximately parallel to said second plane and said image plane, means for indicating the angle of said first plate on its tipping axis, means for indicating the angle of said second plate on its tipping axis, first phase-sensing means coupled to the output of said receiver for sensing the phase of light incident on said zones from said first emitter pair, second phase-sensing means coupled to the output of said receiver for sensing the phase of light incident on said zones from said second emitter pair, a reversible motor controlled by said first phase-sensing means and operatively connected to said first tipping plate to turn the latter in one direction in response to said zones receiving a preponderance of light of one phase from one emitter of said first emitter pair and in the opposite direction in response to said zones receiving a preponderance of light of another phase from the other emitter of the first emitter pair, and a reversible motor controlled by said second phase-sensing means and operatively connected to said second tipping plate to turn the later in one direction in response to said zones receiving a preponderance of light of one phase from one emitter of said second emitter pair and in the opposite direction in response to said zones receiving a preponderance of light of another phase from the other emitter of said second emitter pair.

10. In an autocollimator for aligning a distant optical reflector, the combination of:

a collimator lens system having an optic axis on which said reflector is adapted to be located, a first beam splitter positioned along said axis to produce a secondary optic axis, a second beam splitter positioned on said secondary axis to produce another secondary optic axis, a first light source along one of said secondary axes including a first pair of light emitters located at opposite sides of a first optic plane parallel to said one secondary axis.

a second light source along the other secondary axis including a second pair of light emitters located at opposite sides of a second optic plane parallel to said other secondary axis and optically normal to said first plane, a first light separator located in said first plane between said first source and lens system, a second light separator located in said second plane between said second source and lens system, means for intermittently energizing said emitters in successive order, said lens system receiving and collimating light rays from said emitters to produce a collimated light beam which is transmitted to and then reflected back by said reflector, said lens system being focused to produce an optical image of said separators in an image plane transverse to said optic axis, a photoelectric receiver along said optic axis for receiving the reflected light beam including a first narrow zone of photosensitive detection parallel to said first plane and located in said image plane and a second narrow zone of photosensitive detection parallel to said second plane and located in said image plane in intersecting relation to said first zone, a first optical tipping plate on said optic axis directly before said zones and having its tipping axis parallel to said first zone, a second optical tipping plate along said optic axis directly before said zones and having its tipping axis parallel to said second zone, means for turning said first plate on its tipping axis, means for turning said second plate on its tipping axis, means for indicating the angle of said first plate on its tipping axis, means for indicating the angle of said second plate on its tipping axis, first phase-sensing means coupled to the output of said receiver for sensing changes in the phase of light incident on said zones from said first emitter pair, and second phase-sensing means coupled to the output of said receiver for sensing changes in the phase of light incident on said zones from said second emitter pair.

References Cited in the file of this patent

UNITED STATES PATENTS

| | | | |
|---|---|---|---|
| 2,038,914 | Templeton | Apr. 28, | 1936 |
| 2,578,601 | Rosenthal | Dec. 11, | 1951 |
| 2,764,908 | Hendrix et al. | Oct. 2, | 1956 |
| 2,837,959 | Saunderson et al. | June 10, | 1958 |
| 2,858,453 | Harris | Oct. 28, | 1958 |
| 2,870,671 | Falconi | Jan. 27, | 1959 |
| 2,917,967 | Steglich | Dec. 22, | 1959 |
| 2,977,844 | Winkler | Apr. 4, | 1961 |

FOREIGN PATENTS

| 63,667 | France | Sept. 30, 1955 |
|---|---|---|